United States Patent
Ashton et al.

(10) Patent No.: US 12,119,524 B2
(45) Date of Patent: Oct. 15, 2024

(54) FUEL CELL ASSEMBLY AND ASSOCIATED METHOD OF OPERATION

(71) Applicant: Intelligent Energy Limited, Loughborough (GB)

(72) Inventors: Sean Ashton, Loughborough (GB); Zachary Elliott, Loughborough (GB); Harry Karmazyn, Loughborough (GB); Kevin Kupcho, Loughborough (GB)

(73) Assignee: Intelligent Energy Limited, Loughborouch (GB)

( * ) Notice: Subject to any disclaimer, the term of this patent is extended or adjusted under 35 U.S.C. 154(b) by 1320 days.

(21) Appl. No.: 15/534,464

(22) PCT Filed: Dec. 7, 2015

(86) PCT No.: PCT/GB2015/053737
§ 371 (c)(1),
(2) Date: Jun. 8, 2017

(87) PCT Pub. No.: WO2016/092277
PCT Pub. Date: Jun. 16, 2016

(65) Prior Publication Data
US 2017/0352904 A1 Dec. 7, 2017

(30) Foreign Application Priority Data
Dec. 8, 2014 (GB) ..................... 1421778

(51) Int. Cl.
*H01M 8/04858* (2016.01)
*H01M 8/0202* (2016.01)
(Continued)

(52) U.S. Cl.
CPC ..... *H01M 8/04865* (2013.01); *H01M 8/0202* (2013.01); *H01M 8/04225* (2016.02);
(Continued)

(58) Field of Classification Search
CPC ...................................................... H01M 8/04
See application file for complete search history.

(56) References Cited

U.S. PATENT DOCUMENTS

| | | | |
|---|---|---|---|
| 2003/0211372 A1 | 11/2003 | Adams et al. | |
| 2003/0224227 A1 | 12/2003 | Voss et al. | |

(Continued)

FOREIGN PATENT DOCUMENTS

| | | |
|---|---|---|
| CN | 1656637 A | 8/2005 |
| CN | 101165958 A | 4/2008 |

(Continued)

OTHER PUBLICATIONS

JP 2008186673A. Aug. 14, 2008. English machine translation. (Year: 2008).*

(Continued)

*Primary Examiner* — James Lee
(74) *Attorney, Agent, or Firm* — BAKERHOSTETLER, LLP

(57) ABSTRACT

A method of operating a fuel cell assembly comprising a plurality of fuel cells connected together for collectively providing power to a load, each fuel cell including an anode and a cathode, the method comprising selectively providing an electrical connection between the anode and the cathode of at least one of the fuel cells of the assembly for lowering the voltage across the fuel cell independent of the load.

3 Claims, 2 Drawing Sheets

(51) Int. Cl.
  *H01M 8/04223* (2016.01)
  *H01M 8/04225* (2016.01)
  *H01M 8/04228* (2016.01)
  *H01M 8/04302* (2016.01)
  *H01M 8/04303* (2016.01)
  *H01M 8/0432* (2016.01)
  *H01M 8/0438* (2016.01)
  *H01M 8/0444* (2016.01)
  *H01M 8/04492* (2016.01)
  *H01M 8/04537* (2016.01)
  *H01M 8/04701* (2016.01)
  *H01M 8/04746* (2016.01)
  *H01M 8/04955* (2016.01)
  *H01M 8/24* (2016.01)
  *H01M 8/2484* (2016.01)

(52) U.S. Cl.
  CPC ... *H01M 8/04228* (2016.02); *H01M 8/04238* (2013.01); *H01M 8/04246* (2013.01); *H01M 8/04302* (2016.02); *H01M 8/04303* (2016.02); *H01M 8/0432* (2013.01); *H01M 8/0438* (2013.01); *H01M 8/0444* (2013.01); *H01M 8/04492* (2013.01); *H01M 8/04544* (2013.01); *H01M 8/04552* (2013.01); *H01M 8/04559* (2013.01); *H01M 8/04582* (2013.01); *H01M 8/04701* (2013.01); *H01M 8/04753* (2013.01); *H01M 8/04873* (2013.01); *H01M 8/0488* (2013.01); *H01M 8/04955* (2013.01); *H01M 8/24* (2013.01); *H01M 8/2484* (2016.02)

(56) References Cited

U.S. PATENT DOCUMENTS

| 2004/0137292 | A1 | 7/2004 | Takebe et al. |
| 2008/0090111 | A1 | 4/2008 | Kim et al. |
| 2008/0220294 | A1 | 9/2008 | Miller et al. |
| 2009/0104489 | A1* | 4/2009 | Shin ............... H01M 8/04007 429/413 |
| 2011/0229783 | A1 | 9/2011 | Robb et al. |
| 2012/0237800 | A1* | 9/2012 | Oriol ............... H01M 8/04225 429/429 |

FOREIGN PATENT DOCUMENTS

| CN | 102195064 A | 9/2011 |
| JP | 2000-277136 | 10/2000 |
| JP | 2005-527943 A | 9/2005 |
| JP | 2008-103321 A | 5/2008 |
| JP | 2008-186673 A | 8/2008 |
| JP | 2013-508903 A | 3/2013 |
| JP | 2013-124881 A | 6/2013 |
| KR | 10-0813247 B1 | 3/2008 |
| KR | 2012-0089310 A | 8/2012 |
| WO | WO 2003/083975 A2 | 10/2003 |

OTHER PUBLICATIONS

European Patent Application No. 20187925.1; Extended Search Report; dated Oct. 27, 2020; 13 pages.
International Patent Application No. PCT/GB2015/053737; Int'l Preliminary Report on Patentability; dated Jun. 22, 2017; 16 pages.

* cited by examiner

FUEL CELL ASSEMBLY AND ASSOCIATED METHOD OF OPERATION

CROSS-REFERENCE TO RELATED APPLICATIONS

This patent application is a National Stage Application of international patent application PCT/GB2015/053737 filed Dec. 7, 2015, which claims priority to Great Britain patent application 1421778.0 filed Dec. 8, 2014, the disclosures of which are incorporated by reference in their entirety.

This invention relates to a fuel cell assembly and a method of operating a fuel cell assembly. In particular, it relates to a fuel cell assembly configured to condition individual fuel cells that form the assembly by controlling the voltage across them independent of a load applied to the assembly.

Conventional electrochemical fuel cells convert fuel and oxidant into electrical energy and a reaction product. A common type of electrochemical fuel cell comprises a membrane electrode assembly (MEA), which includes a polymeric ion (proton) transfer membrane between an anode and a cathode and gas diffusion structures. The fuel, such as hydrogen, and the oxidant, such as oxygen from air, are passed over respective sides of the MEA to generate electrical energy and water as the reaction product. A stack may be formed comprising a number of such fuel cells arranged with separate anode and cathode fluid flow paths. Such a stack is typically in the form of a block comprising numerous individual fuel cell plates held together by end plates at either end of the stack.

According to a first aspect, we provide a fuel cell assembly comprising a plurality of fuel cells connected together for collectively providing power to a load, the assembly comprising one or more conditioning switches, each conditioning switch associated with one or more fuel cells of the plurality of fuel cells and configured to selectively provide an electrical connection between an anode and a cathode of its associated fuel cell or, when associated with a group of fuel cells, between an anode of a first fuel cell and a cathode of a final fuel cell in the group, for controlling the voltage across the fuel cell or group of fuel cells independent of the load.

This is advantageous as the assembly is able to condition the fuel cells or component parts thereof, such as a proton exchange membrane or catalyst layer, for efficient operation or for mitigation of fuel cell degradation mechanisms. The electrical connection provided by the conditioning switch may provide for shorting of the associated fuel cell or series-connected group of fuel cells as it may create a lower impedance electrical path relative to that for powering the load. Thus, the fuel cells may be electrically connected together for powering the load and actuation of a conditioning switch may provide an additional or alternative electrical connection from the cell's anode and/or cathode. In particular, the electrical connection may lower the potential across the associated fuel cell or group of fuel cells. Controlling the voltage across individual fuel cells during operation (i.e. during a period in which the fuel cell assembly is supplied with reactants) and particularly at start-up or shut-down (i.e. where the fuel cell assembly may or may not be supplied with reactants or while the supply of reactants is started or stopped) of the fuel cell assembly has been found to have numerous advantageous effects, as will be described below.

Optionally, all of the fuel cells of the plurality of fuel cells are associated with a conditioning switch either individually or as part of a series connected group such that the voltage across each and every fuel cell in the assembly can be controlled independent of the load.

Optionally each fuel cell of the plurality of fuel cells includes a respective conditioning switch for selectively providing the electrical connection. Thus, the voltage across each individual fuel cell may be controlled. Controlling the voltage across or shorting individual fuel cells in the assembly may be advantageous. The conditioning switches may be configured to be actuated individually and sequentially. Alternatively, more than one of the conditioning switches may be configured to be actuated at the same time.

The fuel cell assembly may comprise a fuel cell stack.

Optionally the conditioning switch or switches comprises a semiconductor device, such as a transistor. Alternatively, the conditioning switch or switches comprise inductor coupled relays.

Optionally each fuel cell includes a fuel cell plate configured to abut a membrane electrode assembly of the fuel cell, the fuel cell plate including at least one connector for connecting to the conditioning switch. The fuel cell plates, that may separate the individual fuel cells in a fuel cell stack, provide a convenient body to form a connection to the conditioning switches. Optionally, the fuel cell plates may include a tab that projects from the plate for connection to a conditioning switch or may comprise a cavity for receiving a connection to the conditioning switch. The conditioning switch or switches may be located within a body of the fuel cell assembly or external to the body of the fuel cell assembly.

Optionally the fuel cell plates comprise a plurality of connectors and the conditioning switches correspondingly comprise a plurality of switching elements configured to connect to the plurality connectors and operate together to selectively provide the electrical connection for their associated fuel cell. Each conditioning switch may be provided by a plurality of semiconductor devices. The plurality of connectors on the fuel cell plates may advantageously provide connection points for the plurality of semiconductor devices. This may be advantageous if a large current is required to be passed by the electrical connection formed by the switching elements. Accordingly, the plurality of semiconductor devices may be configured to be actuated together to provide the function of the conditioning switch.

Optionally each fuel cell plate includes at least two connectors and the at least two connectors are formed on different sides of the fuel cell plate. The at least two connectors may be provided on the same side of the fuel cell plate, different sides or opposed sides of the fuel cell plate. If a large current is required to be passed by the electrical connection then providing the connectors on different parts of the fuel cell plate is advantageous to reduce the peak current density in the region of a connector. In other embodiments, a single connector on each fuel cell plate is provided for connection to the conditioning switch.

Optionally the plurality of fuel cells are arranged together in a stack including a manifold arranged with the fuel cell stack for delivering a reactant to or receiving an exhaust flow from each of the plurality of fuel cells in the stack, the assembly including a substrate extending between the fuel cell stack and the manifold, the substrate including the one or more conditioning switches. Optionally each fuel cell includes a fuel cell plate configured to abut a membrane electrode assembly of the fuel cell, the substrate configured to engage with each fuel cell plate. A common substrate for each of the fuel cells may be provided. The substrate is advantageous as the conditioning switches for a plurality of fuel cells can be mounted on the common substrate which can be positioned such that the conditioning switches carried thereby connect to the fuel cells in the stack.

Optionally, the electrical connection includes a fuel cell voltage control element configured to control the voltage across the fuel cell with which it is associated to a predetermined voltage. The fuel cell voltage control element may comprise a controllable impedance. The fuel cell voltage control element may be configured to control the voltage at the anode and the voltage at the cathode of its associated fuel cell independently. The fuel cell voltage control element may be configured to control the fuel concentration/fuel amount/anode flooding level to control the anode voltage. The fuel cell voltage control element may be configured to control the oxidant concentration/oxidant amount/cathode flooding control the cathode voltage.

Optionally the fuel cell voltage control element is controllable such that the predetermined voltage is configurable during operation of the fuel cell assembly. Thus, the voltage to which each fuel cell or an anode/cathode thereof is lowered/raised to can be actively controlled. The conditioning switch may provide a connection to the fuel cell voltage control element. Alternatively, the conditioning switch may form part of the fuel cell voltage control element. In either case, an electrical connection between the anode and cathode of its associated fuel cell(s) is formed.

Optionally a plurality of conditioning switches are provided and a conditioning switch controller is configured to control said conditioning switches. Thus, the fuel cells of the assembly may each have an associated conditioning switch and/or fuel cell voltage control element. The controller may advantageously actuate the conditioning switches and/or control the fuel cell voltage control elements as required, such as sequentially or together.

Optionally the controller is configured to actuate the conditioning switches to selectively provide the electrical connection at start-up or shut-down of the fuel cell assembly. At start-up, actuation of the conditioning switches may protect the fuel cells of the assembly against degradation caused by a reactant pressure front moving through the assembly.

At shut-down, the actuation of the switches may assist in consumption of residual reactants. Thus, outside of a start-up period, such as a period of time after initiation of the supply of reactants, the selective actuation of the conditioning switches may be reduced in frequency or stopped.

Optionally the controller is configured to actuate the conditioning switches to selectively provide the electrical connection sequentially over the plurality of fuel cells. Optionally less than 10% or 5% of the fuel cells in the assembly or only a single fuel cell is provided with the electrical connection at any one time. It will be appreciated that while each conditioning switch may be actuated individually, the controller may actuate more than one at any one time.

Optionally the controller is configured to, in response to a voltage of the fuel cell assembly exceeding a predetermined threshold, actuate the conditioning switches to selectively provide the electrical connection. Operating the fuel cell assembly close to an open circuit voltage may cause degradation which may be mitigated by the selective use of the conditioning switches.

Optionally the controller is configured to, in response to one or more measures of fuel cell performance passing an associated threshold, actuate the conditioning switches to selectively provide the electrical connection.

Optionally the measure of fuel cell performance comprises;
i) a measure of contaminants, such as carbon monoxide, in the fuel cell assembly; or
ii) a measure of the voltage of any one (or more than one) fuel cell in the plurality of fuel cells; or
iii) a measure of flooding of an individual fuel cell (or more than one fuel cell) with a coolant; or
iv) a measure of environmental conditions proximal the fuel cell assembly such as temperature or humidity.

Optionally the controller is configured to actuate the conditioning switches to selectively provide the electrical connection at least between initiation of an increase in reactant flow through the fuel cell assembly of the assembly and the reactant flow rate or pressure reaching a predetermined level. An increase in reactant flow may cause a pressure front, which may be significant at start-up of the fuel cell. Any detrimental effect of the pressure front may be mitigated by use of the conditioning switches.

Optionally the controller is configured to, in response to an indication that the voltage across a particular one of the fuel cells has, or is about to, become negative with respect to at least one other fuel cell in the assembly, actuate the conditioning switch to selectively provide the electrical connection for that particular fuel cell. Optionally the controller is configured to monitor the voltage across each of the fuel cells in the assembly.

Optionally the controller is configured to provide for the control of the temperature of at least one fuel cell in the fuel cell assembly by the actuation of its associated conditioning switch to selectively provide the electrical connection for said at least one fuel cell. This may be advantageous if the fuel cell assembly is operating at sub-zero conditions to maintain a predetermined threshold temperature across the plurality of fuel cells. The controller may be configured to actuate the conditioning switch of fuel cells at ends of a fuel cell stack in preference to fuel cells at a centre of a fuel cell stack when operating the fuel cell stack in ambient temperatures lower than a threshold or when the fuel cell stack is at a temperature lower than a threshold.

Optionally the controller is configured to balance the temperature of the fuel cells in the fuel cell assembly by selectively actuating the conditioning switches of particular fuel cells to increase their temperature.

Optionally the controller is configured to, at start-up of the fuel cell assembly, actuate the conditioning switch of at least one of the fuel cells to provide said electrical connection and, in response to a current flow through that fuel cell reaching a threshold value, actuate its associated conditioning switch to break the electrical connection. Optionally the controller is configured to, at start-up of the fuel cell assembly, actuate the conditioning switch of at least two of the fuel cells to provide said electrical connection and, in response to a current flow through a particular fuel cell of the at least two fuel cells reaching a threshold value, actuate its associated conditioning switch to break the electrical connection. Thus, as the current flow through each fuel cell reaches its threshold value, the conditioning switches may be actuated to remove the electrical connection.

Optionally the controller is configured to, at start-up of the fuel cell assembly, actuate the conditioning switches of a majority of the fuel cells in the fuel cell assembly to provide said electrical connection and, in response to a current flow through a particular fuel cell reaching a threshold value, actuate its associated conditioning switch to break the electrical connection. In a further example, the electrical connections may be provided for all of the fuel cells in the assembly and when each fuel cell reaches a predetermined voltage, its associated conditioning switch may be opened to break the connection.

According to a second aspect, we provide a method of operating a fuel cell assembly comprising a plurality of fuel cells connected together for collectively providing power to a load, the method comprising;

selectively providing an electrical connection between an anode and a cathode of at least one of the fuel cells of the assembly or, for a group of fuel cells, between an anode of a first fuel cell and a cathode of a final fuel cell in the group for controlling the voltage across the fuel cell or group of fuel cells independent of the load.

Optionally the method includes the step of actuating the conditioning switches to selectively provide the electrical connection at start-up or shut-down of the fuel cell assembly. Outside a start-up period or shut-down period the switches may be actuated less or only in response to a measured variable of the fuel cell assembly, such as its temperature or individual fuel cell voltage.

Optionally the method includes the step of actuating the conditioning switches to selectively provide the electrical connection sequentially over the plurality of fuel cells. Optionally less than 10%, 5% of the fuel cells or only a single fuel cell is provided with the electrical connection at any one time.

Optionally the method includes the step of, in response to a voltage of the fuel cell assembly exceeding a predetermined threshold, actuating the conditioning switches to selectively provide the electrical connection. The threshold may comprise a voltage based on the open circuit voltage of the assembly.

Optionally the method includes the step of, in response to one or more measures of fuel cell performance passing an associated threshold, actuating the conditioning switches to selectively provide the electrical connection.

Optionally the measure of fuel cell performance comprises;
i) a measure of contaminants, such as carbon monoxide, in the fuel cell assembly; or
ii) a measure of the voltage of any one (or more than one) fuel cell in the plurality of fuel cells; or
iii) a measure of flooding of an individual fuel cell (or more than one fuel cell) with a coolant; or
iv) a measure of environmental conditions proximal the fuel cell assembly such as temperature or humidity.

Optionally the method includes the step of actuating the conditioning switches to selectively provide the electrical connection at least between initiation of an increase in reactant flow through the fuel cell assembly of the assembly and the reactant flow rate or pressure reaching a predetermined level. The predetermined level may be a nominal operating pressure for the given reactant flow rate.

Optionally the method includes the step of, in response to an indication that the voltage across a particular one of the fuel cells has, or is about to, become negative with respect to at least one other fuel cell in the assembly, actuating the conditioning switch to selectively provide the electrical connection for that particular fuel cell.

Optionally the method includes the step of monitoring the voltage across each of the fuel cells in the assembly.

Optionally the method includes the step of providing for the control of the temperature of at least one fuel cell in the fuel cell assembly by the actuation of the conditioning switches to selectively provide the electrical connection for said at least one fuel cell.

Optionally the method includes the step of balancing the temperature of the fuel cells in the fuel cell assembly by selectively actuating the conditioning switches of particular fuel cells to increase their temperature.

Optionally the method includes the step of, at start-up of the fuel cell assembly, actuating the conditioning switches of at least two of the fuel cells to provide said electrical connection and, in response to a current flow through a particular fuel cell reaching a threshold value, actuate its associated conditioning switch to break the electrical connection.

Optionally the method includes the step of, at start-up of the fuel cell assembly, actuating the conditioning switches of a majority of the fuel cells in the fuel cell assembly to provide said electrical connection and, in response to a current flow through a particular fuel cell reaching a threshold value, actuate its associated conditioning switch to break the electrical connection.

Optionally the step of selectively providing an electrical connection comprises continuously providing said electrical connection for less than 30 seconds, less than ten seconds, less than five seconds, less than three seconds or less than one second.

According to a further aspect we provide a computer program or computer program product including instructions for execution on a computing device having a processor and memory for performing the method of the second aspect.

It will be appreciated that the processor and/or memory may be embedded with the fuel cell assembly and the processor may comprise a microprocessor or microcontroller.

There now follows, by way of example only, a detailed description of embodiments of the invention with reference to the following figures, in which.

Figure 1:
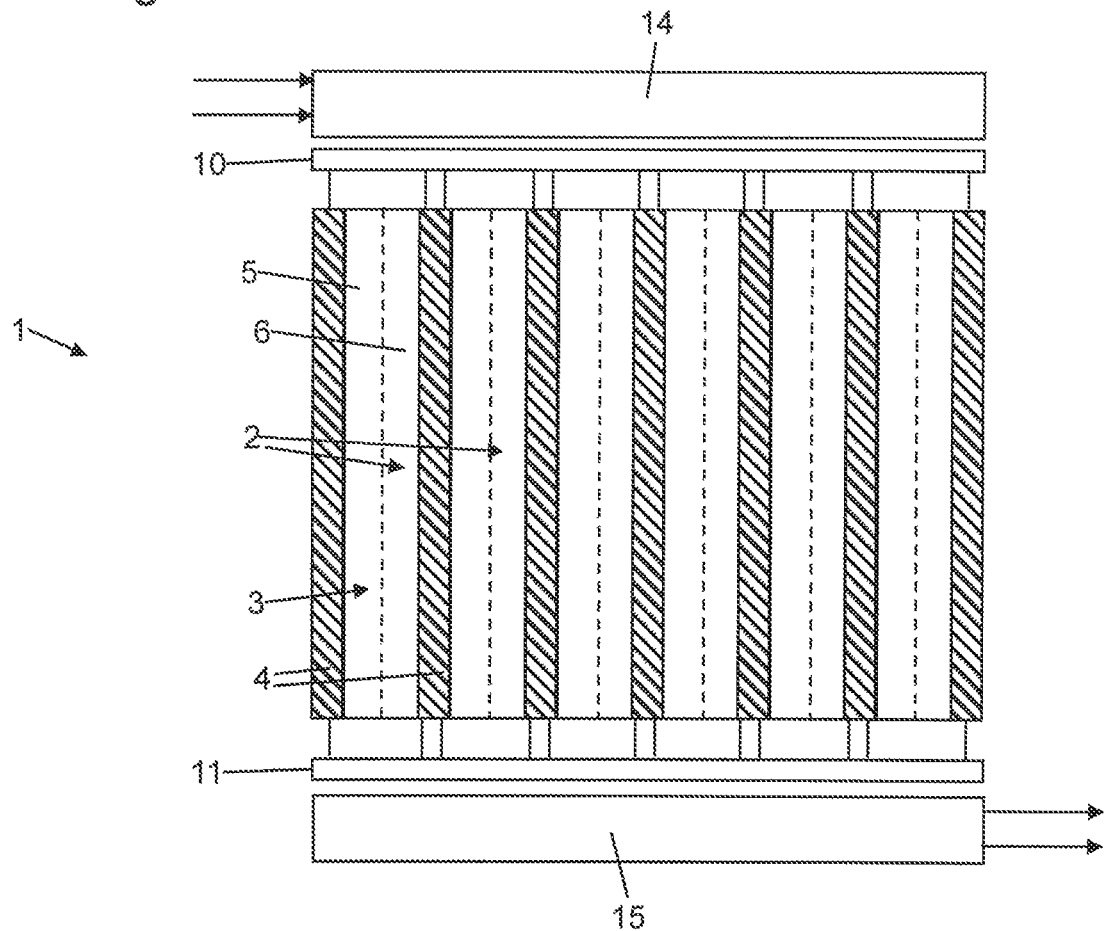
FIG. 1 shows an exploded schematic diagram of a first example fuel cell assembly with a conditioning switch module.

FIG. 1 shows a fuel cell assembly 1 which, in this example, comprises a fuel cell stack. The fuel cell stack comprises a plurality of fuel cells 2 connected together for collectively providing power to a load (not shown). Thus, the individual fuel cells 2 are electrically connected together to provide a combined power output which may be used to drive a motor. For example, the fuel cell assembly may be configured to provide the power source for a vehicle. The fuel cells 2 may comprise a membrane electrode assembly 3 including a proton exchange membrane, catalyst layers and gas diffusion layers and are arranged between fuel cell plates 4. The fuel cell plates in this example are bipolar plates and form an anode side of a fuel cell on one side and the cathode side of an adjacent fuel cell on their other side. Thus, each fuel cell includes an anode 5 and a cathode 6. The plates could, alternatively, comprise unipolar plates. The fuel cell plates 3 may include or define channels for receiving a reactant flow to direct over its associated membrane electrode assembly. The channels may extend from one end of the plate 3 to the other.

Figure 2:
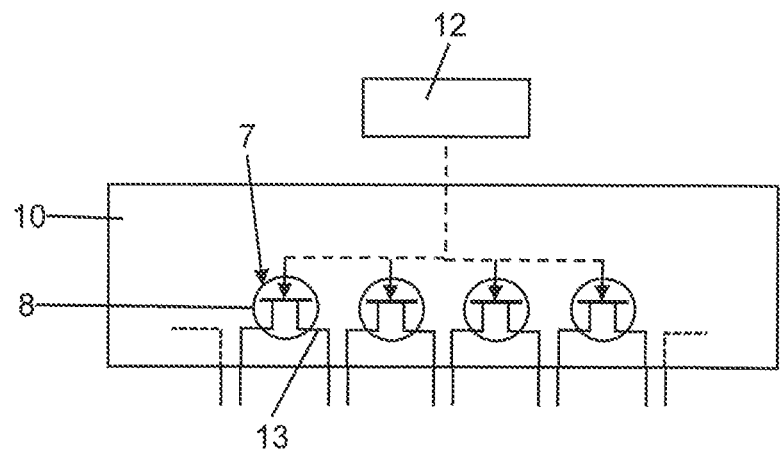
FIG. 2 shows a more detailed schematic view of the fuel cell assembly of FIG. 1.

With reference to FIG. 2, one or more of the plurality of fuel cells 2 include a conditioning switch 7. The conditioning switch 7 is configured to selectively provide an electrical connection 13 or shunt path between the anode 5 and the cathode 6 of its associated fuel cell 2 for shorting its associated fuel cell 2. Thus, the conditioning switches by way of the selective electrical connection 13 control the voltage across cells independent of the load. The electrical connection shorts its associated fuel cell by selectively providing a low impedance path (such as a low impedance path relative to fuel cell powering the load as part of the assembly). The active control of the conditioning switches 7 during operation of the fuel cell stack 1 and, in particular, the active control of the voltage across individual fuel cells in the stack independent of the load, is advantageous for the performance of the fuel cell stack. This active individual fuel cell voltage control may be used advantageously in all fuel cell technologies employing a polymer electrolyte membrane i.e. an acid or alkaline polymer electrolyte membrane based fuel cell or a phosphoric acid fuel cell. While not wishing to be bound by theory, it is thought that the selective shorting of individual fuel cells in the assembly may improve the electrochemical health of the membrane and/or catalyst layers.

In this example, each of the fuel cells 2 in the fuel cell stack 1 includes an associated conditioning switch. In particular, each fuel cell 2 in the fuel cell stack 1 is provided with a conditioning switch 7 comprising a first and second switching elements 8, 9. The first switching elements 8 are provided on a first substrate 10 and the second switching elements 9 are provided on a second, different substrate 11. The first and second switching elements 8, 9 connect to the anodes and cathodes of each of the fuel cells in different positions. This is advantageous as providing more than one switching element allows for a distribution of the current density flowing between the switching elements and the anode/cathode.

The switching elements of the conditioning switch 7 may be embodied as semiconductor devices and in this example comprise transistors. Thus, the first substrate 10 and/or second substrate 11 may comprise a printed circuit board (PCB) or ceramic substrate having the switching elements thereon.

The conditioning switches and, in particular the switching elements, are configured to receive a switching signal from a controller 12. The controller 12 may pass control signals to a gate terminal of the transistor based switching elements to control an electrical connection between two other transistor terminals that are connected to the anode 5 and cathode 6.

In another example, the electrical connection 13 includes a fuel cell voltage control element (not shown). The fuel cell voltage control element may comprise an active component, such as a controllable impedance. This may allow for the fuel cell voltage control element, when the conditioning switch forms the electrical connection, to actively control the voltage across the fuel cell independent of the load. The fuel cell voltage control element may be configured such that the voltage at the anode and/or the voltage at the cathode may be individually controlled. The fuel cell voltage control element may be configured to control the fuel concentration/fuel amount/anode flooding level to control the anode voltage. The fuel cell voltage control element may be configured to control the oxidant concentration/oxidant amount/cathode flooding control the cathode voltage. It may be advantageous to control the electrical connection in combination with the fuel or oxidant level to control the voltage at the anode and/or cathode. The fuel cell voltage control element may be controlled by the controller 12.

Returning to FIG. 1, an inlet manifold 14 is shown configured to deliver one or more reactants to each of the fuel cells 2. An exhaust manifold 15 is configured to receive unused reactant(s) and reaction by-products from the fuel cells and provide an exhaust flow out of the fuel cell assembly. Thus the fuel cell plates 4 and/or the fuel cells 2 are configured to receive the reactant flow from the inlet manifold 14, direct the reactant(s) over an active area of each of the fuel cells and pass the exhaust flow to the exhaust manifold 15. The first substrate 10 is mounted between the stack of fuel cells 2 and the inlet manifold 14. The second substrate is mounted between the stack of fuel cells 2 and the outlet manifold 15.

The fuel cell plates 4 may include connectors, which may comprise projecting tabs, for connecting to the conditioning switches or switching elements thereof. Accordingly, the first and second substrates 10, 11 may be adapted, such as by including apertures or connecting structures, to connect their conditioning switches to the connectors/tabs of the fuel cell plates 4.

It will be appreciated that while FIGS. 1 and 2 show one example of how the selective switching of the electrical connection may be achieved, other structures and arrangements are available. For example, semiconductor devices may be integrated into the fuel cell plates.

Figure 3:
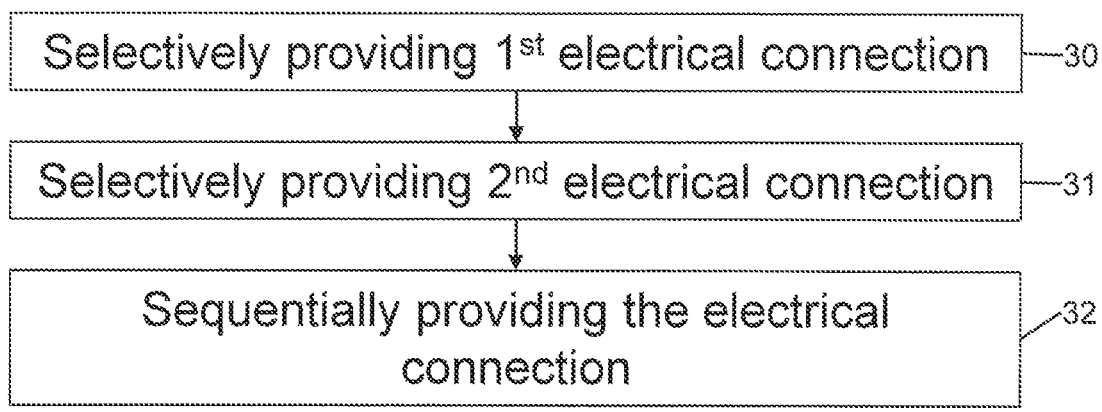
FIG. 3 shows a first flow chart illustrating a method of operation of the fuel cell assembly.

FIG. 3 shows a method of operating a fuel cell assembly comprising, in step 30, selectively providing an electrical connection between the anode and the cathode of at least one of the fuel cells of the assembly for controlling the voltage across the fuel cell independent of the load. The selective electrical connection is removed after a conditioning period of, for example, 10 ms. The method may comprise, shown at step 31, selectively providing an electrical connection between the anode and the cathode of at least one other of the fuel cells of the assembly for controlling the voltage across the fuel cell independent of the load.

The method may include sequentially providing the electrical connection for the plurality of fuel cells in the fuel cell assembly, as shown at step 32. The sequential provision of electrical connections may be initiated on start-up or shutdown of the fuel cell assembly. This step may be performed a limited number of times such that a subset of fuel cells are provided with an electrical connection while the remaining fuel cells are not. Alternatively, all of the fuel cells may be sequentially provided with their associated electrical connection a predetermined number of times or until a fuel cell assembly measure, such as a cathode exhaust temperature is reached. The method may be invoked periodically during operation of the fuel cell assembly. Thus, during operation of the fuel cell assembly, two modes of operation may be provided, a first in which the fuel cells are provided with said electrical connection for controlling their voltage and a second mode in which the electrical connections are not provided. The fuel cell assembly may be configured to alternate periodically between the first and second modes. The electrical connection for any one fuel cell may be provided momentarily, such as for less than 5 seconds, less than 2 seconds, less than 1 second, less than 0.5 seconds or less than 0.1 seconds. The selection of the first or second mode may be based on a measure associated with fuel cell assembly relative to a threshold, such as temperature or voltage across one or more of the fuel cells.

The momentary increase in fuel cell current and the reduction of the fuel cell's potential due to the electrical connection may have a number of potential benefits for fuel cell operation. A number of advantageous implementations of the method are described below. It will be appreciated that the methods described below may be implemented by the switching controller and/or fuel cell voltage control element being configured to perform the described method.

Firstly, the selective electrical connection may be used to rapidly condition membrane electrode assemblies of the fuel cells. Thus, the selective electrical connection may be provided in turn or together for the fuel cells in the fuel cell assembly one or more times while receiving a flow of reactants. Using the selective electrical connection, rapid voltage and load cycling of the fuel cells can be safely induced irrespective of the balance in the behaviour of each fuel cell. While not wishing to be bound by theory it is thought that this process of rapidly cycling fuel cell voltage and load quickly facilitates the oxidation and evaporation of solvents/impurities used in fuel cell fabrication, whilst inducing the temperature and humidity cycles intended to encourage the changes in the membrane and ionomer structure necessary to condition the fuel cell.

Further, the selective electrical connection may be provided to rapidly condition the fuel cell after extended periods without operation. Thus, the assembly may be configured to determine a period of time since the last operation of the fuel cell assembly and, if it exceeds an unused time threshold, provide for the selective electrical connection of one or more of the plurality of fuel cells of the assembly.

The fuel cell voltage control element may be configured to safely manipulate the current, cathode/anode potentials, temperature and hydration of the fuel cell assembly by way of the selective electrical connection. These parameters may be controlled to commission the fuel cell assembly. Thus, we provide a method of commissioning a fuel cell assembly comprising selectively providing an electrical connection between the anode and the cathode of at least one of the fuel cells of the assembly for controlling the voltage across the fuel cell independent of the load. The commissioning of the fuel cell assembly may comprise operating the fuel cell assembly for the first time with a reactant flow after it has been assembled.

The method has been found to be advantageous at maintaining a predetermined hydration level of the fuel cell membrane and/or the catalyst layer. Use of the method may avoid membrane dehydration during extended periods at, or close to, open circuit voltage (OCV). It has been found that, in certain circumstances, operating the fuel cell assembly with a high impedance load or in open circuit conditions, the membrane and catalyst, which forms an active area of each fuel cell and over which the electrochemical fuel cell reaction occurs, may become dehydrated. This may cause a reduction in the operating lifetime of the fuel cell assembly or a reduction in performance. Without wishing to be bound by theory it is thought that the provision of the electrical connection allows the electrochemical reaction of the fuel cell to proceed at a greater rate, which may generate, water as a reaction by-product (in a hydrogen oxygen fuel cell) to hydrate the membrane.

Accordingly, the method may comprise a method of hydrating a fuel cell assembly comprising selectively providing an electrical connection between the anode and the cathode of at least one of the fuel cells of the assembly for controlling the voltage across the fuel cell independent of the load. The method may be periodically, or continuously performed to hydrate the fuel cell membrane and/or catalyst, extending operating lifetime by avoiding degradation mechanisms associated with low humidity conditions. The method may be performed if the voltage across the fuel cells of the assembly or a subset of the fuel cells of the assembly is above a predetermined voltage threshold, such as near an OCV value. Accordingly, the first and second modes of operation described above may be determined based on the above-mentioned fuel cell assembly voltage or another measure of fuel cell hydration.

The hydration of the fuel cell assembly using the selective electrical connection is particularly advantageous in fuel cell assemblies that operate without humidification fluid flows introduced into the fuel cell assembly (i.e. for assemblies in which humidification is generated within the fuel cell assembly by way of electrochemical reaction by-products).

The method has been found to be advantageous for removal of blocking species e.g. fuel cell catalyst poisoning species contained in fuel cell oxidant (i.e. air contaminants) and/or surface oxides. In particular, operation of the fuel cell voltage control element may be used to manipulate the potential at the cathode of each fuel cell to mitigate the effects of cathode poisoning.

In particular, the fuel cell voltage control element may be employed to induce starvation of fuel cell oxidant (i.e. cathode starvation) such that the fuel cell cathode potential falls toward that the anode potential, and a low fuel cell potential of less than 0.2 V may be achieved irrespective of oxidation supply and/or power demand. In a hydrogen-oxygen PEM fuel cell assembly the fuel cell cathode potential is nominally above 0.6 $V_{RHE}$ (reversible hydrogen electrode) but may be lowered below 0.5, 0.4, 0.3, 0.2 or 0.1 $V_{RHE}$.

Thus, we provide a method of mitigating the effects of cathode poisoning of fuel cells in a fuel cell assembly comprising selectively providing an electrical connection between the anode and the cathode of at least one of the fuel cells of the assembly for controlling the voltage across the fuel cell independent of the load. The voltage at the cathode electrode may be reduced in preference to control of the anode potential. As described above, this may be achieved through fluid manipulation of oxidant supply or cathode operating conditions by, for example, reducing oxidant concentration such that a cathode limiting current (i.e. limited by the oxidant available) decreases to a value significantly below that of an anode limiting current (i.e. limited by the fuel available). Upon engaging the selective electrical connection to induce 'oxidant starvation conditions', the cathode electrochemical potential can be induced to decrease toward the anode electrochemical potential.

The method has been found to be advantageous at, in a proton exchange membrane hydrogen-oxygen fuel cell assembly, facilitating the re-deposition of dissolved platinum $Pt^{2+}$ catalyst material. In particular, by manipulating the cathode potential periodically so that the cathode falls below substantially 0.4 V, it may be possible to re-precipitate any dissolved $Pt^{2+}$ ions back onto active catalyst particles in a catalyst layer of each fuel cell thereby improving fuel cell durability. Without wishing to be bound by theory it is suspected that during regular fuel cell operation, surface atoms of Platinum particles dissolve into the fuel cell membrane electrolyte forming $Pt^{2+}$ ion intermediates that re-precipitate as Platinum particles in the membrane electrolyte in the presence of hydrogen. However, because these particles re-precipitate in the membrane rather than in a catalyst layer adjacent the membrane, they are inactive for catalysing the fuel cell reactions.

Thus, the method may comprise a method of controlling a level of catalytic particles in a catalyst layer of at least one of a plurality of fuel cells that form a fuel cell assembly comprising selectively providing an electrical connection between the anode and the cathode of at least one of the fuel cells of the assembly for controlling the voltage across the fuel cell independent of the load. The voltage at the cathode electrode may be reduced in preference to control of the anode potential.

The method has been found to advantageous at maintaining a predetermined fuel cell assembly (or fuel cell stack) temperature. The method may be engaged, for example, in response to low power demand periods (power demand relative to a threshold) to maintain stack temperature during operation in sub-zero ambient environments, irrespective of the fuel cell load demand.

Thus, the method may comprise a method of controlling the temperature of fuel cells in a fuel cell assembly comprising a plurality of fuel cells, the method comprising selectively providing an electrical connection between the anode and the cathode of at least one of the fuel cells of the assembly for controlling the voltage across the fuel cell independent of the load. Therefore, the electrical connection may allow a current to flow which in turn may heat the fuel cell. The method may be configured to maintain a predetermined fuel cell temperature. During operation of the fuel cell assembly, two modes of operation may be provided, a first in which the fuel cells are selectively provided with said electrical connection (such as sequentially) for increasing their temperature and a second mode in which the electrical connection(s) are not provided, the first mode operated if the temperature of the fuel cell assembly is below a predetermined temperature threshold (or if the power output is below a "low power" output threshold) and the second mode operated of the temperature is above the predetermined temperature threshold. The predetermined temperature threshold may comprise 4° C. (or 0, 1, 2, 3, 5, 6° C.).

The method has been found to be advantageous for manipulation of the anode potential to facilitate oxidation and/or desorption of fuel cell catalyst poisoning contaminants present in an anode fluid flow, such as contaminants in a fuel (e.g. carbon monoxide, CO).

The fuel cell voltage control element may be configured to induce fuel starvation conditions by increasing the anode potential to an overpotential to the extent that fuel contaminants such as CO are oxidised/desorbed restoring fuel cell performance.

Thus the method may comprise a method of removing contaminants from an anode of a fuel cell of a plurality of fuel cells that form a fuel cell assembly comprising selectively providing an electrical connection between the anode and the cathode of at least one of the fuel cells of the assembly for controlling the voltage across the fuel cell independent of the load. In particular, the method may include the step of controlling the anode potential in preference to the cathode potential. This may be achieved through fluid manipulation of fuel supply or anode operating conditions by, for example, reducing fuel concentration such that the anode limiting current (i.e. limited by the fuel available) decreases to a value significantly below that of the cathode limiting current (i.e. limited by the oxidant available). Upon engaging the selective electrical connection to induce 'fuel starvation conditions', the anode electrochemical potential can be induced to increase toward the cathode electrochemical potential.

In a further example, the controller may be configured to actuate the conditioning switches to selectively provide the electrical connection at least between initiation of an increase in reactant flow through the fuel cells of the assembly and the reactant flow rate or pressure reaching a predetermined level. The increase in reactant flow may cause a reactant "front" of increased pressure to move through the fuel cell assembly. This pressure front may be significant when starting-up the fuel cell assembly from an off-state. A pressure front of decreased pressure may also move through the fuel cell assembly when shutting down a fuel cell assembly and the controller may also be configured to actuate the conditioning switches in such a situation.

The method can be implemented to advantageously shunt current during the presence of hydrogen/air fronts flowing through an anode/cathode which may offer the benefit of reduction of a reverse-current decay mechanism and/or rapid fuel cell shutdown.

The reverse-current decay mechanism occurs when a fuel cell in the fuel cell assembly is driven by a current generated by the other fuel cells in the assembly such that a reverse current flow compared to normal operation is produced. This may degrade the performance of the fuel cell concerned. By providing the electrical connection and/or controlling the voltage of the fuel cell by way of the electrical connection, a low cell voltage (such as less than 0.2 V for a hydrogen oxygen polymer membrane based fuel cell) may be achieved during the reactant pressure front.

It has been found that the degradation usually occurring during unmitigated start-up/shutdown where pressure fronts occur may be almost completely eliminated. This dramatically improves fuel cell durability, particularly in applications requiring many complete fuel cell start-up/shutdown events such as automotive applications.

Thus, the method may include the step of, in response to an increase in pressure and/or flow rate of a reactant (such as a fuel) through a fuel cell assembly, actuate said conditioning switches of one or more of the fuel cells in the assembly. The conditioning switches may be actuated all together, or in groups and sequentially, or individually and sequentially.

On shut down of a hydrogen fuelled fuel cell assembly residual hydrogen may be present in the fuel cell assembly. It is important that the hydrogen concentration is reduced to a predetermined level. The method may be used to consume any remaining hydrogen in the fuel cell assembly on shutdown of the assembly. By actuating the conditioning switches the hydrogen may be consumed rapidly.

Thus, the method may include the step of, on shut-down of the fuel cell assembly, actuate said conditioning switches of one or more of the fuel cells in the assembly. The conditioning switches may be actuated all together, or in groups and sequentially, or individually and sequentially. This step may be performed in response to a stop in the flow of fuel and/or oxidant through the fuel cell assembly, such as when a compressor that drives a reactant through the assembly is deactivated.

It has been found that in certain circumstances, on actuation of the conditioning switches the residual hydrogen present in an anode compartment/fuel feed connections is rapidly consumed such that the fuel cell stack is completely discharged, and left in a safe dormant state after only a few seconds. Similarly, oxygen may be consumed in a cathode compartment to evacuate the cathode compartment.

In other embodiments (not shown) a single conditioning switch (which may be formed of one or more switching elements) may provide for control of the voltage across a group of series connected fuel cells in the fuel cell assembly. Thus, the conditioning switch may act to provide an electrical connection that forms a circuit with the series connected group of fuel cells. Therefore, rather than providing the electrical connection for a single fuel cell, the electrical connection is provided for a group of fuel cells.

The fuel cell assembly may form one of a plurality of fuel cell assemblies in a fuel cell system. The actuation of the conditioning switches may be performed across each of the fuel cell assemblies in turn. Thus, the conditioning switches of a first fuel cell assembly may be actuated followed by the conditioning switches of a second fuel cell assembly. This may be advantageous as the fuel cell assemblies not undergoing the actuation of the conditioning switches may operate in a normal mode of operation.

The invention claimed is:

1. A fuel cell assembly comprising a plurality of serially connected fuel cells connected together for collectively providing power to a load, the assembly comprising:
   a plurality of conditioning switches, each of the conditioning switches being associated with one fuel cell or a group of fuel cells of the plurality of serially connected fuel cells, each fuel cell having a catalyst layer, and configured to selectively provide an electrical connection between an anode and a cathode of its associated fuel cell or group of fuel cells for controlling a voltage thereof;
   wherein each of the conditioning switches (i) selectively provides the respective electrical connection in a first mode of operation of the fuel cell assembly and (ii) deactivates the respective electrical connection in a second mode of operation of the fuel cell assembly; and
   a controller programmed to actuate, responsive to a measure of a fuel cell performance passing a threshold, the conditioning switches associated with said fuel cell or group of fuel cells to selectively provide its electrical connection in the first mode of operation; and,
   in which the controller is programmed to actuate the conditioning switches to selectively provide its respective electrical connection between initiation of an increase in reactant flow through the fuel cell assembly and reactant flow rate or pressure causing a pressure front reaching a predetermined level; and,
   whereby, damage to the catalyst layer of the fuel cells from the pressure front and a reverse current decay is reduced.

2. A fuel cell assembly comprising a plurality of serially connected fuel cells connected together for collectively providing power to a load, the assembly comprising:
   a plurality of conditioning switches, each of the conditioning switches being associated with one fuel cell or a group of fuel cells of the serially connected fuel cells and configured to selectively provide an electrical connection between an anode and a cathode of its associated fuel cell or group of fuel cells for controlling a voltage thereof;
   wherein each of the conditioning switches (i) selectively provides the respective electrical connection in a first mode of operation of the fuel cell assembly and (ii) deactivates the respective electrical connection in a second mode of operation of the fuel cell assembly; and
   a controller programmed to actuate, responsive to a measure of a fuel cell performance passing a threshold, the conditioning switches associated with said fuel cell or group of fuel cells to selectively provide its electrical connection in the first mode of operation; and,
   in which the controller is programmed to actuate the conditioning switches to selectively provide its respective electrical connection between initiation of an increase in reactant flow through the fuel cell assembly and reactant flow rate or pressure reaching a predetermined level.

3. A fuel cell assembly according to claim 2, in which the controller is programmed to, at start-up of the fuel cell assembly, actuate said conditioning switch in response to a current flow through said fuel cell or group of fuel cells reaching a threshold value, actuate said conditioning switch to break the electrical connection.

* * * * *